United States Patent [19]
Sahm et al.

[11] Patent Number: 5,692,467
[45] Date of Patent: Dec. 2, 1997

[54] VENTILATION APPARATUS FOR AN ENCLOSURE

[75] Inventors: William C. Sahm; Daniel L. Mikrut, both of Peoria, Ill.

[73] Assignee: Caterpillar Inc., Peoria, Ill.

[21] Appl. No.: 190,018

[22] PCT Filed: Aug. 23, 1991

[86] PCT No.: PCT/US91/06018

§ 371 Date: Jan. 24, 1994

§ 102(e) Date: Jan. 24, 1994

[87] PCT Pub. No.: WO93/03938

PCT Pub. Date: Mar. 4, 1993

[51] Int. Cl.$^6$ .................................................. F02B 77/00
[52] U.S. Cl. ..................... 123/198 E; 125/41.12; 181/204; 165/135
[58] Field of Search ................... 123/198 E, 41.12, 123/41.7; 181/198, 201, 202, 204, 224, 225; 165/135; 180/68.1

[56] References Cited

U.S. PATENT DOCUMENTS

| 4,020,900 | 5/1977 | Kitagawa | 165/135 |
| 4,086,976 | 5/1978 | Holm et al. | 180/54 |
| 4,455,971 | 6/1984 | Kirchweger et al. | 123/41.7 |
| 4,503,931 | 3/1985 | Sugimoto et al. | 181/204 |
| 4,516,657 | 5/1985 | Allard | 181/225 |

FOREIGN PATENT DOCUMENTS

| 0 345 144 | 12/1989 | European Pat. Off. |
| 25 54 752 | 6/1977 | Germany. |
| 2 044 702 | 10/1980 | United Kingdom. |

*Primary Examiner*—Noah P. Kamen
*Attorney, Agent, or Firm*—William C. Perry

[57] ABSTRACT

The ventilation apparatus (51) of the present invention provides an airflow control system that is designed to minimize noise while providing adequate airflow both during engine operation and after engine shutdown. The enclosure (24) that is divided into first and second compartments (26,28). The first compartment (26) houses the drive train components (14) and the second compartment (28) houses the fluid cooling apparatus (30). The first compartment (26) is provided with at least one air communicating means (52) to transfer ambient air from outside the enclosure through a circuitous air passageway (54) lined with sound absorptive material (60,62). The air passageway (54) is formed in at least one of the walls that forms the first compartment (26) so that it may be critically positioned with respect to the more heat sensitive components (14) housed within the enclosure (24) yet maximizing the efficient use of available space. A plurality of blowers (78) may be included in the air passageway (54) to selectively direct the flow of air toward selected portions of the first compartment (26).

11 Claims, 8 Drawing Sheets

VENTILATION APPARATUS FOR AN ENCLOSURE

TECHNICAL FIELD

This invention relates to a ventilation apparatus and more particularly to a ventilation apparatus for an enclosure lined with sound absorptive material.

BACKGROUND ART

The subject of noise pollution has become a critical issue in recent years and has had a very significant impact on the earthmoving industry. Rigid sound requirements for equipment have been adopted worldwide, resulting in extensive modifications to vehicles in an attempt to reduce the noise produced during their operation. Obviously, one of the primary sources of noise emanates from the engine of the vehicle. The most logical way to reduce the noise is to encase the engine in an enclosure that is lined with acoustical foam or other sound absorptive material. While this solution appears simple enough, one must remain aware of the cooling requirements for the engine and other powertrain components such as torque converters, hydraulic pumps, etc., whose heat exchangers are cooled by air passing through the engine's enclosure. It is not uncommon for the ventilation air moving through an engine enclosure of an earthmoving vehicle to pick up a heat load equivalent to approximately 20% of the output power. Therefore it is an absolute necessity to provide openings in the enclosure of sufficient size to not only reduce the temperature of the components within the enclosure but to also provide a flow of air through a radiator and various heat exchangers to cool fluid that is circulated internally through the engine and related components. This flow of air has conventionally been provided by an axial fan that is positioned behind the radiator and heat exchangers to draw ambient air from outside the enclosure through the enclosure and the fluid cooling devices. Arrangements of this type have been used successfully to attenuate a large portion of the noise that escapes from an engine enclosure. However, as the noise requirements have become more stringent, problems with this method of noise attenuation have been encountered. A logical solution to the more stringent requirement is to increase the amount of sound absorptive material within the enclosure and to reduce the number and/or size of openings in the enclosure through which noise may escape. When this happens, the flow of cooling air into the enclosure is reduced to a point of inadequacy. Not only is the flow of air that is passed by the fluid cooling devices reduced, but the flow of air through the enclosure itself is reduced which results in an overall increase in temperature within the compartment. This adversely affects many temperature sensitive components, such as the alternator, the fuel injection system and various electronic components such as microprocessors that have been incorporated into the operation of an engine through modern day engine technology. To increase the air flow, it has been common practice to provide a fan that will rotate at a greater speed. While this solution has achieved moderate success, we have reached a point where the fan speed requirements are so great that the noise created by the fan has surpassed the engine as the dominant noise source, particularly at high idle with an engine driven fan.

The next step in the evolution of the sound suppressed engine compartment resulted in the separation of the radiator and fluid cooling devices, including the fan, from the engine and its related components. One such design is typically disclosed in U.S. Pat. No. 3,866,580 issued to Whitehurst et al. on Feb. 18, 1975. This design provides a wall between the fluid cooling components and the engine related components. Ambient air outside the enclosure is drawn through openings in the side and top of the enclosure by an engine driven fan. The air flow passes through the fluid cooling components that are positioned on the engine side of the fan. The enclosure is ventilated by ambient air that is drawn from air inlets positioned at the rear and sides of the vehicle by a pressure differential created by the relationship between the engine exhaust pipe and the enclosure exhaust stack. As exhaust gasses are expelled from the engine into the exhaust stack, a pressure differential or a "venturi effect" is created that draws air through the engine enclosure. This requires relatively large openings in the engine compartment, however, to provide adequate air flow; and thus, highly efficient noise attenuation is sacrificed. Also, the flow of air is not controllable and is only effective while the engine is running. With a tightly sealed, sound suppressed engine enclosure, the temperature rise experienced within the enclosure after engine shut down can result in premature failure of temperature sensitive components such as microprocessors.

Another design that discloses separated compartments for the engine related components and the fluid cooling components is disclosed in U.S. Pat. No. 4,086,976 issued to Holm et al. on May 2, 1978. Holm et al. is very similar in function to Whitehurst et al. in the method of ventilating the two compartments. A flow of ambient air is drawn through the fluid cooling components by an engine driven fan, and the engine compartment is ventilated via a similar pressure differential created by the flow of exhaust gasses from an exhaust pipe of the engine. A conduit extends between the engine compartment and the compartment housing the engine driven fan so that the fan may also be utilized to ventilate the engine compartment. This design exhibits the same deficiencies discussed with respect to the Whitehurst et al. design. Additionally, since a fan is a volumetric flow device and the airflow through the conduit enters the fan inlet air stream, the fan speed must be increased above that speed sufficient to satisfy the fluid cooling device airflow requirements, thereby resulting in a fan noise penalty.

Yet another design that utilizes separate compartments between the engine and related drive component and the fluid cooling components is disclosed in U.S. Pat. No. 4,854,278 issued to Gunter Honecker on Aug. 8, 1989. This design utilizes a fan in the fluid cooling compartment to draw air from openings in the front of the vehicle, through the engine compartment and into the fluid cooling compartment. The air from the engine compartment is then mixed with ambient air drawn in through the top of the fluid cooling component compartment upstream from the radiator and heat exchangers. Again the design exhibits many of the deficiencies pointed out with respect to the design disclosed in Whitehurst et al. Additionally, it must be noted that the heated air from the engine compartment will increase the overall temperature of the air drawn through the fluid cooling devices. Since a heat exchanger's performance is proportional to the difference in inlet temperature between the air and the fluid, cooling efficiency is sacrificed.

U.S. Pat. No. 4,226,217, issued to Haslbeck et al. provides a compartment for the fluid cooling apparatus that is positioned forwardly of the compartment in which the engine and other related driven components are housed. A fan in the fluid cooling compartment draws air through the heat exchanging components and forces the air rearwardly toward a wall that divides the two components. A plurality of conduits open onto the wall and extend into the engine compartment to a location adjacent a specific engine component. Air from the fan is forced into the conduits and directed specifically toward these components to reduce the surrounding temperature. This design suffers from the same deficiencies as the prior art previously identified with respect to heat build up after engine shut down. With this arrangement, the air which is forced into the engine enclosure has already been heated as it passed through the cooling system. Furthermore, there are no openings shown in the top of the enclosure where the heated air will tend to rise and be trapped. For the purpose of minimizing noise, the fan for the fluid cooling system would be rotating as slowly as possible. Therefore, air entering the engine enclosure can be preheated to a temperature that is close to the maximum allowable temperature for those components that are temperature sensitive such as rubber belts and alternators. Therefore to adequately cool the components within the engine enclosure, the size of the conduit and consequently the size of openings into and out of the engine enclosure may have to be large enough to allow considerable noise to escape.

The present invention is directed to overcoming one or more of the problems set forth above.

DISCLOSURE OF THE INVENTION

In one aspect of the present invention, a ventilation apparatus is adapted to provide a flow of cooling air to a plurality of components positioned within one enclosure that is defined by a plurality of sound absorbing panels. The ventilation apparatus includes a means for communicating ambient air from a location outside the enclosure to a location within the enclosure. The air communicating means forms as circuitous air passageway that is lined with sound absorptive material and is positioned within at least a first of the plurality of panels defined by the enclosure. A plurality of blowers are mounted within the air communicating means for drawing ambient air through the air communicating means and directing into the enclosure under variable flow and pressure.

In another aspect of the present invention, a ventilation apparatus is adapted to provide a flow of cooling air to a plurality of heat producing components housed within an engine compartment of a vehicle. The ventilation apparatus includes first and second side panels that are defined by the engine enclosure. First and second means for communicating ambient air from a location outside the engine enclosure to a location within the enclosure are defined by the first and second side panels respectively. A first and second plurality of blowers are respectively defined in the first and second air communicating means to selectively direct a flow of cooling air to specific components housed within the engine compartment.

In another aspect of the present invention, a ventilation apparatus is provided for the engine enclosure of a vehicle that has a first compartment that is lined with sound absorptive material and encases a plurality of heat producing drive train components that power the vehicle. A second compartment is included in the enclosure and houses at least one cooling system that is associated with fluid that is circulated internally through at least one of the drive train components. The first compartment defines first and second sidewalls that are positioned on opposite sides of the drive train components. A first and second means for communicating a flow of cooling air that is drawn from ambient air outside the compartment and directed toward selected ones of the plurality of heat producing components is defined by the respective first and second sidewalls.

In yet another aspect of the present invention, a ventilation apparatus is adapted to provide a flow of cooling air within an enclosure that houses a plurality of heat producing components. The enclosure defines a first wall member having a construction sufficient for supporting a first panel of sound absorptive material. An intake port is also formed in the first wall member. A plurality of sound absorptive blocks are mounted to the inner surface of the first wall member in surrounding relation to the air intake port to define an air passageway that communicates ambient air from outside the enclosure to the components housed within. A means is provided for drawing air through the air passageway and the enclosure and expelling the air from the enclosure.

A ventilation apparatus as set forth above utilizes a means through which air may be drawn from outside the enclosure through a circuitous air passageway that is lined with blocks of sound absorptive material. The panels are varied in thickness to absorb a wide range of noise frequencies. A plurality of highly efficient vaneaxial blowers may be positioned within the air passageway to draw ambient air through the air passageway and selectly direct a flow of air at specific temperature sensitive components. The construction of the air passageway absorbs the sounds of the engine and related drive train components as well as the noise created by the blowers themselves. By utilizing a plurality of blowers, they can be operated simultaneously at a very low speed. This creates much less overall noise than a singular axial fan typically associated with fluid cooling systems that incorporate radiators and head exchangers. Therefore, it can be seen that an enclosure for an engine, or other components that produce a great deal of noise and heat, is provided that may be very tightly enclosed to greatly reduce the noise levels that emanate from within the enclosure. At the same time, adequate cooling to the components within the enclosure is provided and is sufficient to permit the normal function of sophisticated temperature sensitive components.

BEST MODE FOR CARRYING OUT THE INVENTION

Figure 1:
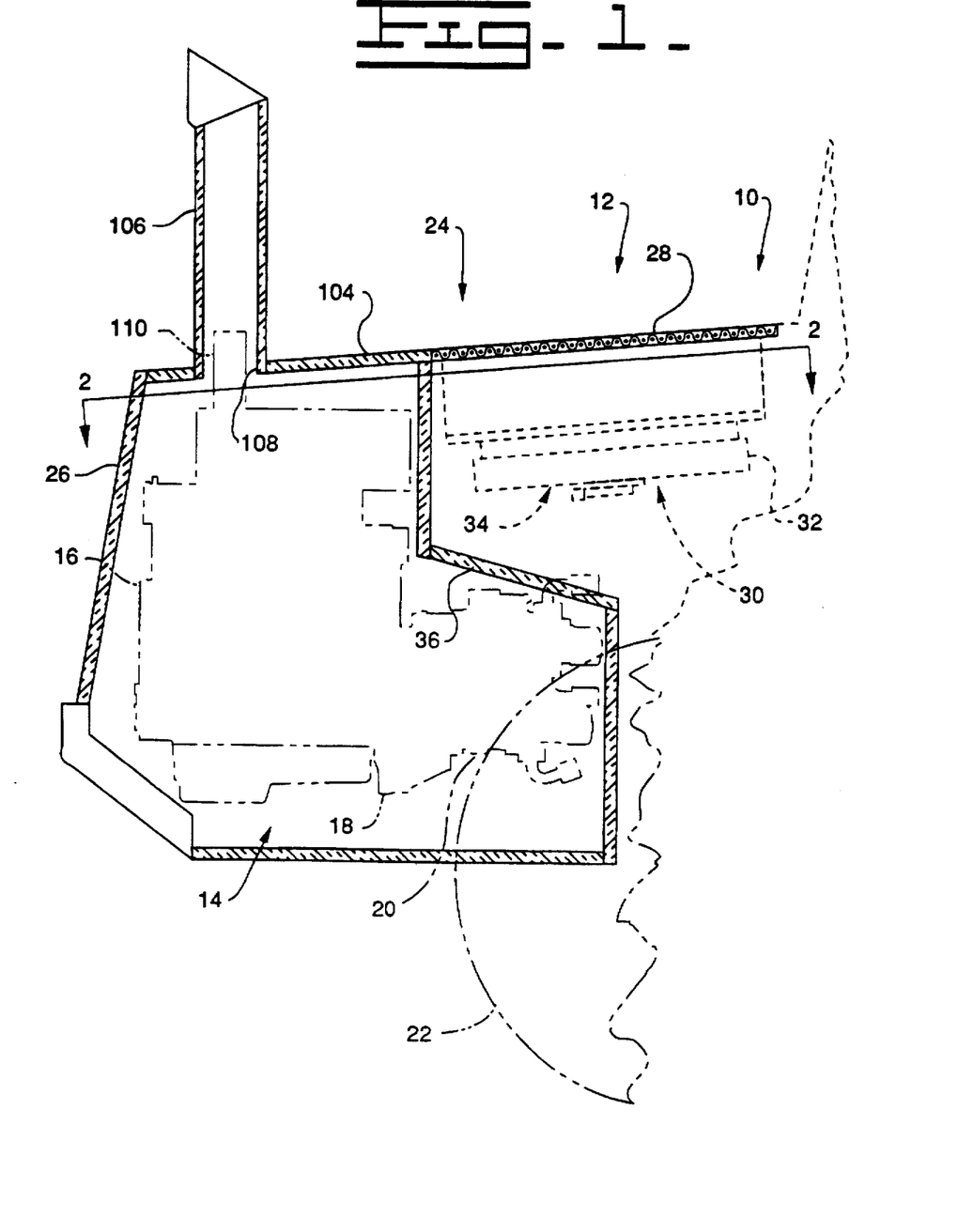
FIG. 1 is a diagrammatic sectional view of the rear portion of a vehicle having a ventilation apparatus that embodies the principles of the present invention.

Turning now to the drawings, and particularly FIG. 1, a vehicle 10 is partially shown that defines a rear portion 12 for housing a plurality of drive train components shown generally at 14. The drive train components typically include an engine 16, a torque converter 18 and a transmission 20 that are utilized to provide power to a pair of rear wheels 22 of the vehicle which are shown in phantom lines in FIG. 1.

Figure 4:
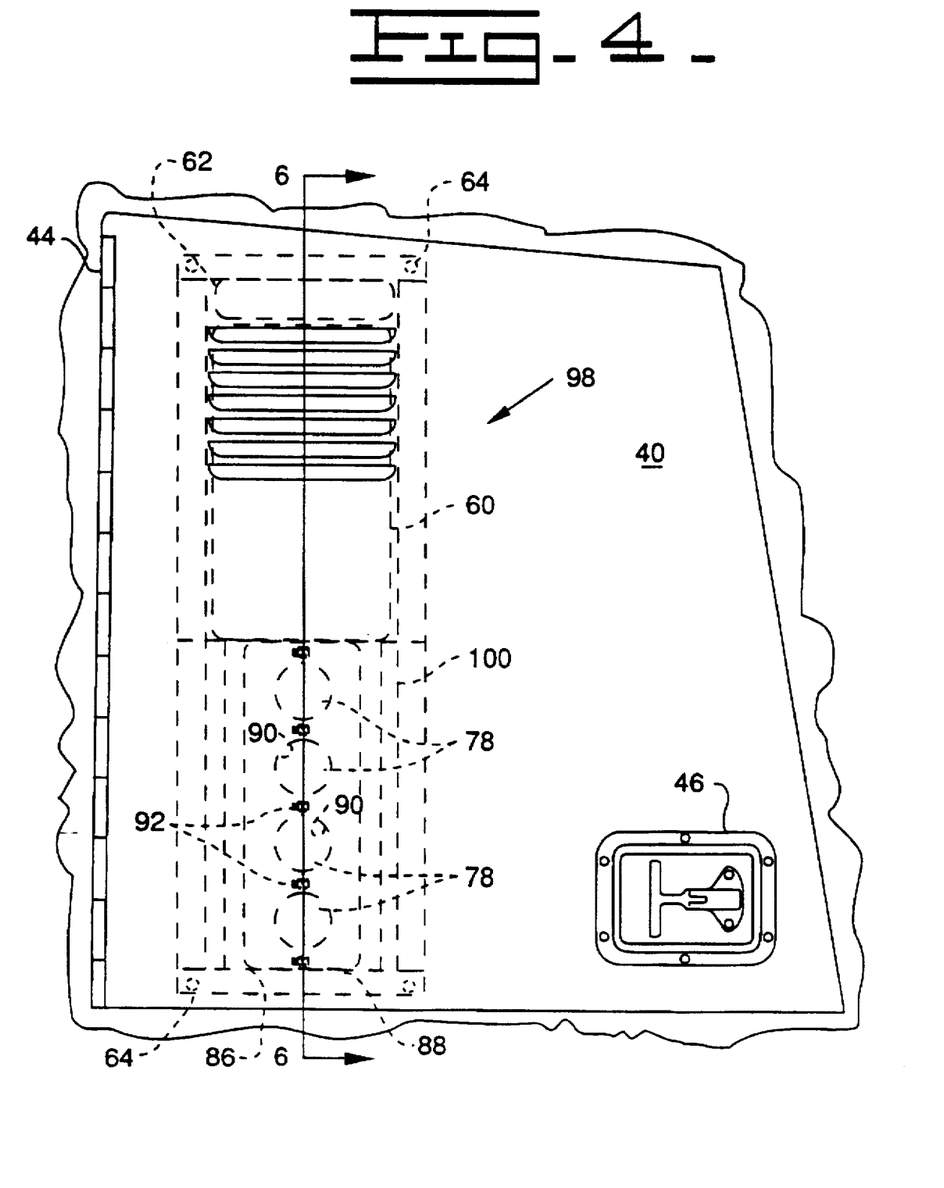
FIG. 4 is a partial side elevational view as viewed along lines 4—4 of FIG. 2.
Figure 5:
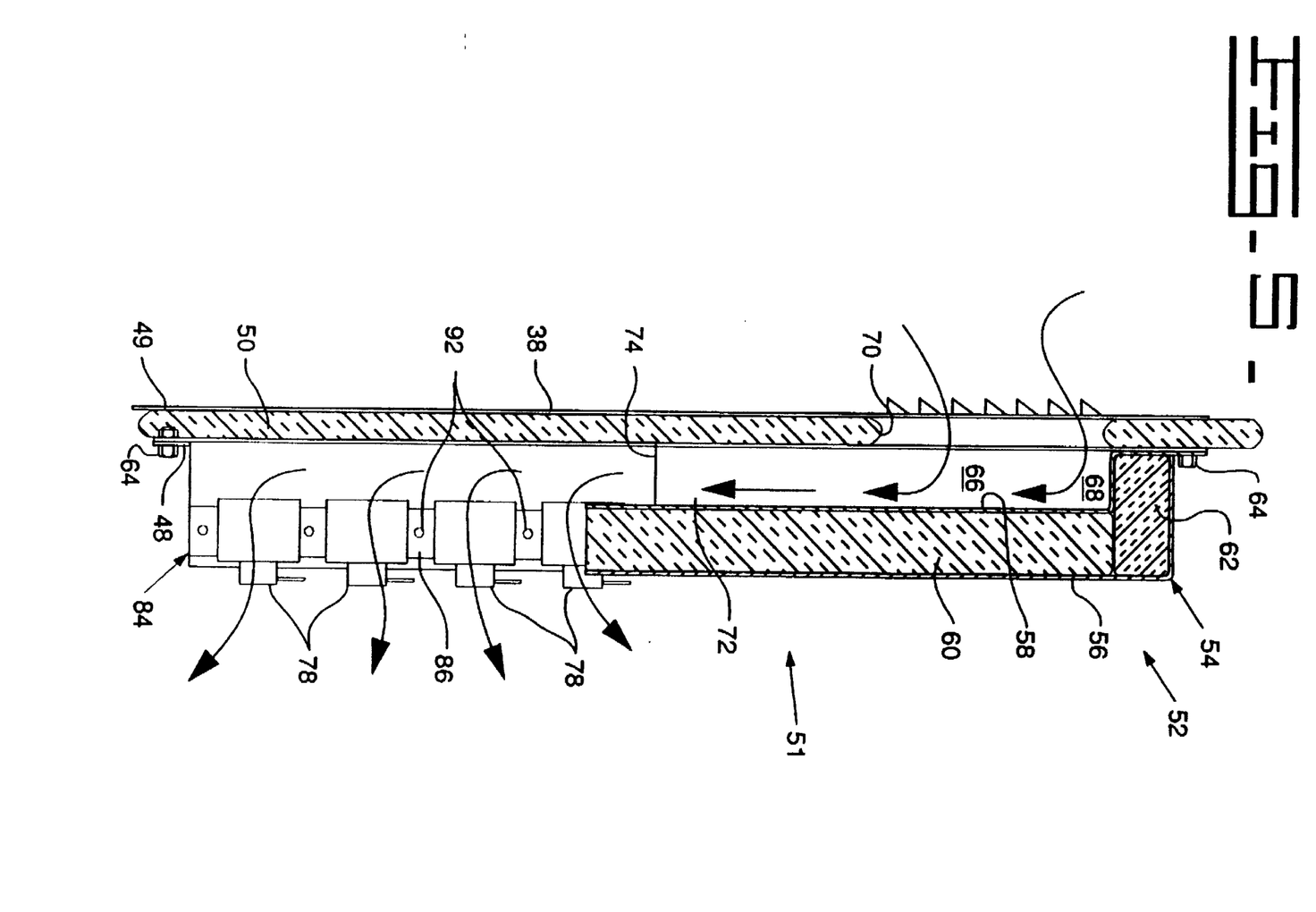
FIG. 5 is a cross-sectional view taken along lines 5—5 indicated in FIG. 3.
Figure 6:
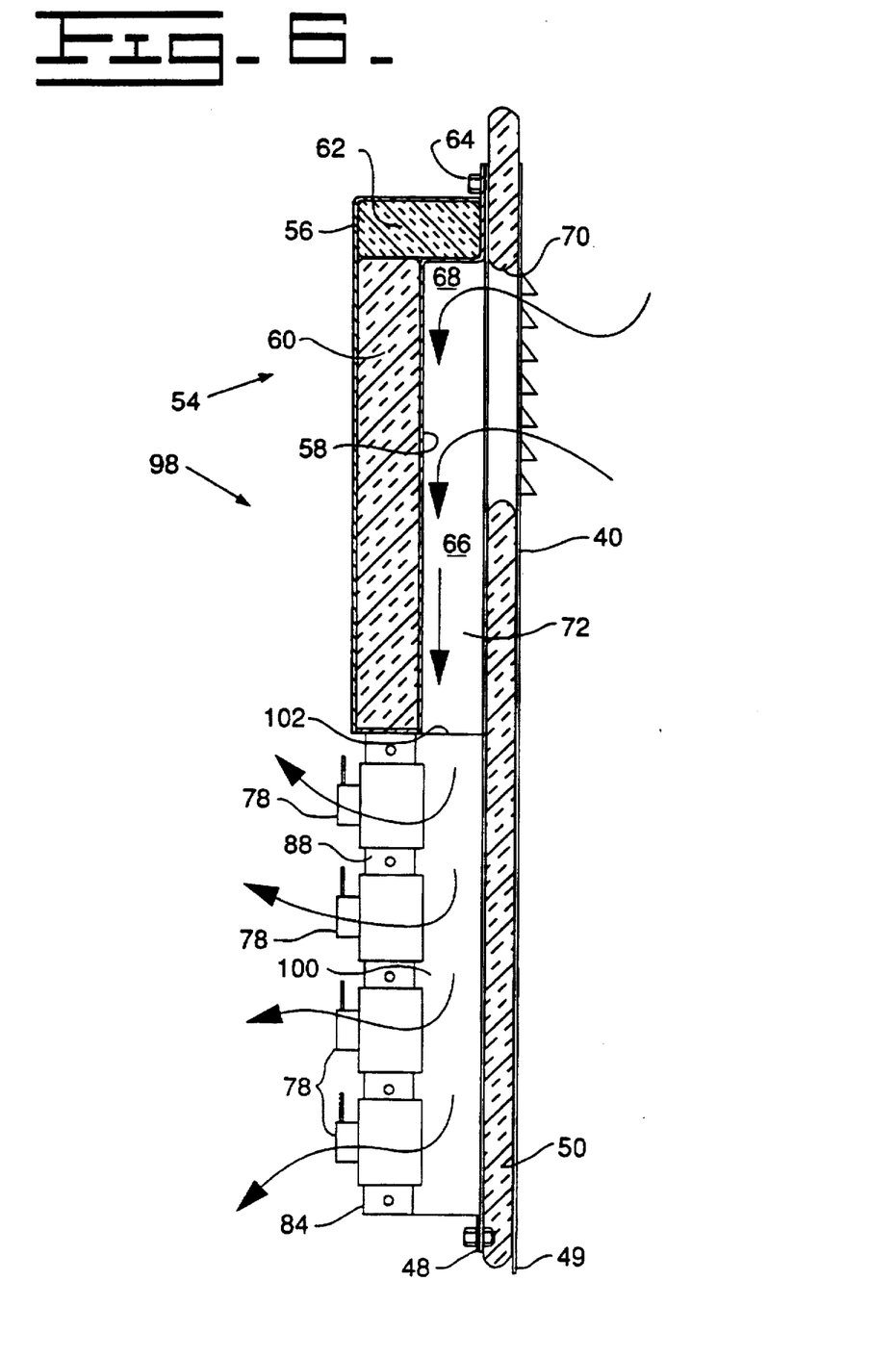
FIG. 6 is a cross-sectional view taken along lines 6—6 indicated in FIG. 4.

An enclosure 24 is provided for these components that totally encases them on all sides. The enclosure 24 is divided into two compartments. A first compartment 26 defines a plurality of wall members that form an encasement around the drive train components 14 at the rear-most portion of the vehicle, and a second compartment 28 which houses only the fluid cooling apparatus 30 and is positioned forwardly of the first compartment. The fluid cooling apparatus typically consists of a radiator 32 and fan assembly 34 for cooling water that is circulated through the engine and can include additional heat exchangers (not shown) for fluid that circulates through the transmission or other hydraulic systems. The first and second compartments 26 and 28 are separated by a noise wall 36 that is lined with acoustical foam. A typical acoustical foam that is known to work well in this application is commercially available under the name "Conaflex" from H. L. Blackford, Inc., and is available in panels of various thicknesses. Two of the wall members that form the first compartment 26 include a pair of vertically oriented side panels 38 and 40 that are moveable about a hinge 42 and 44 respectively at their forward edge. Both side panels may be moved between a first, closed position and a second, open position by manipulation of a latch assembly 46. When open, complete access is afforded to the engine 16 and related drive train components 14 for service and repair. When the side panels 38 and 40 are closed, they act as a barrier to contain the noise created by the operation of the engine and related components within the enclosure. Each side panel 38 and 40 is identical in construction and has an inner, perforated skin of sheet metal 48 and an outer skin of sheet metal 49 that is solid. A panel 50 of sound absorptive material of the type previously discussed sandwiched therebetween (FIGS. 4-6).

Each side panel 38 and 40 is provided with a ventilation apparatus 51. In the first side panel 38, shown best in FIGS. 3 & 5, the ventilation apparatus 51 includes a first means 52 for communicating ambient air from outside the enclosure 24 to the components 14 within the first compartment 26. The first air communicating means 52 further defines a first air passageway 54 that includes a first or outer "C" shaped channel 56 (FIGS. 5 & 7)-that is made of non-perforated sheet metal. A secondary or inner "C" shaped channel 58, formed of perforated sheet metal, nests within the first channel 56 and when assembled forms a support for a first generally vertically oriented block of acoustical foam 60 and a second, generally horizontally oriented block 62 of acoustical foam as shown in FIG. 5. The channels 56 and 58 are mounted to the inner skin 48 of the first side panel 38 with any suitable sheet metal fastener 64. Being so constructed, a duct 66 is formed between the inner channel 58 and the inner skin 48 of the first panel 38. The duct defines an upper, inlet portion 68 that is positioned adjacent an air inlet port 70 that is formed in the first side panel 38. A lower or outlet portion 72 of the duct extends downwardly from the upper portion 68 to form substantially a 90° bend with respect to the inlet port 70. With the angle of the bend as such, high frequencies of noise are efficiently attenuated.

A second air passageway 74 is positioned laterally adjacent the rearmost portion 76 of the first air passage and is in communication with the outlet portion 72 of the duct 66. The second air passageway 74 forms a plenum which houses a plurality of blowers 78.

Figure 3:
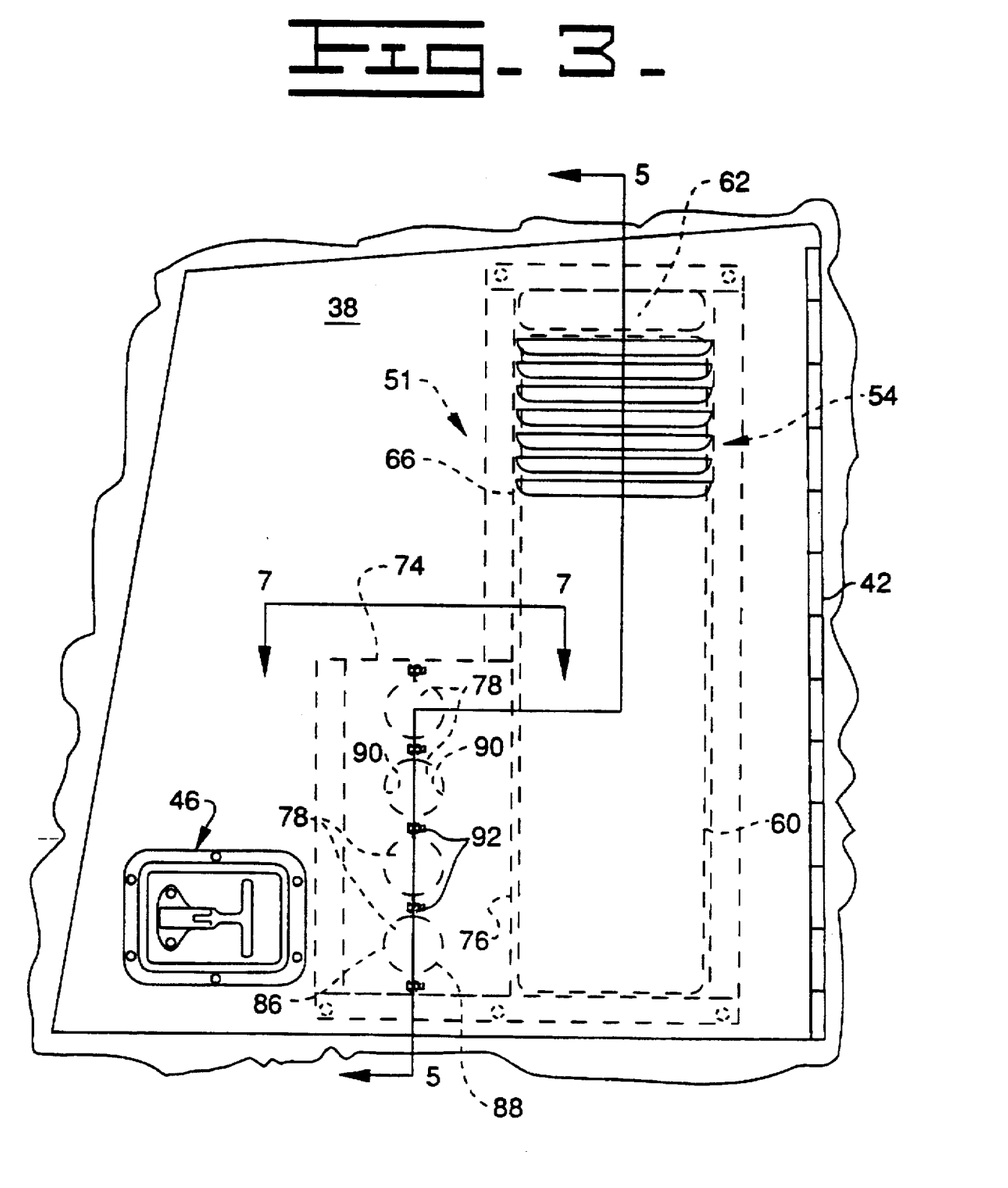
FIG. 3 is a partial side elevational view as viewed along lines 3—3 in FIG. 2.
Figure 7:
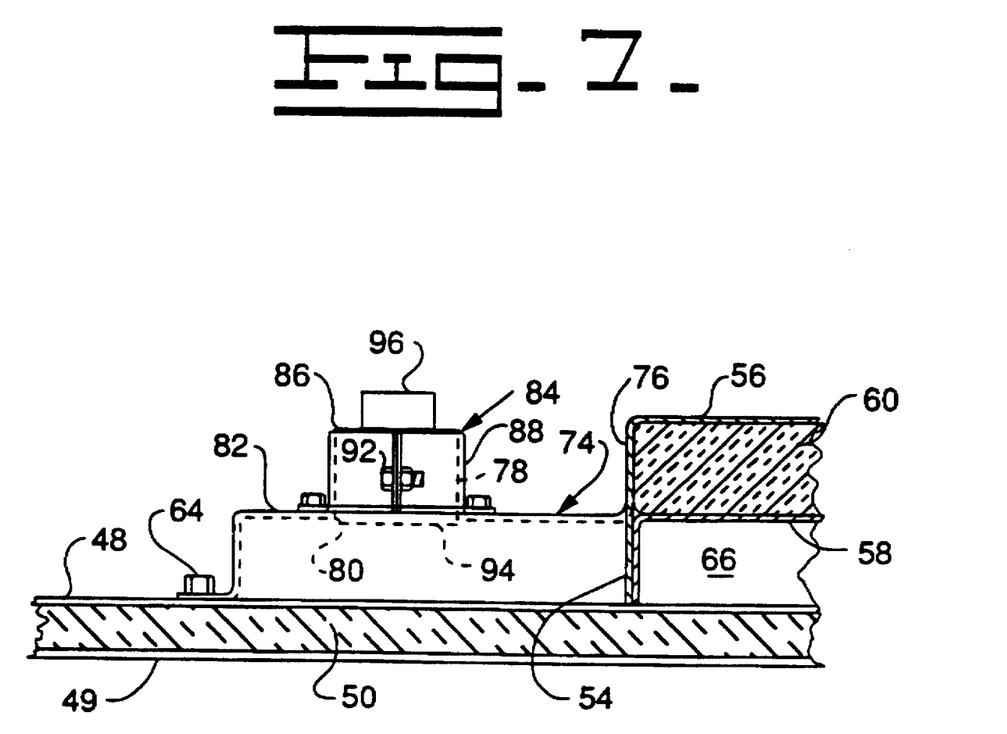
FIG. 7 is a cross-sectional view taken along lines 7—7 indicated in FIG. 3.

With specific reference to FIG. 7, it can be seen that the blowers 78 are round in configuration and are mounted in vertical alignment with respect to one another in an opening 80 formed on an inner wall 82 of the plenum 74. The blowers 78 are secured by a bracket 84 to the inner wall of the plenum 74. The bracket 84 defines two halves 86 and 88 that mirror one another and form arcuate scallops 90 (FIG. 3). The bracket halves 86 and 88 are mounted together with fasteners 92 in surrounding relation to the blowers to capture the blowers between opposing scallops 90. The bracket 84 is then fastened to the plenum 74 with the intake side 94 of the blowers positioned within the opening 80 of the plenum 74 and an output side 96 extending into the first compartment 26. The blowers 78 are of the vaneaxial type, which are highly efficient electric blowers. Since the operation of vaneaxial blowers are well known to those skilled in the art, their operation need not be further described. In the present application a blower such as those identified as the VAX-3BD blower, which may be purchased from Globe Motors, is known to work quite well.

The second side panel 40 of the first compartment 26 is positioned on the opposite side of the drive train components 14 from the first side of panel 38. Its construction with respect to the inner and outer skins of sheet metal and the core of acoustical foam is identical to that of the first side panel 38 and therefor the same reference numerals will be applied to both panels where appropriate. The second side panel 40 defines a second means 98 for communicating ambient air to the components positioned within the first compartment. The second air communicating means 98 defines a first air passageway 54 having an air duct 66 substantially identical to that of the first air communicating means 52. The duct 66 is lined with first and second blocks of acoustical foam 60 and 62 that border the inlet portion 68 and the outlet portion 72 of the duct. The duct 66 is positioned adjacent an air inlet port 70 formed through the second side panel 40. The lower or outlet portion 72 of the duct extends downwardly from the inlet port 70 at substantially a 90° angle.

Figure 2:
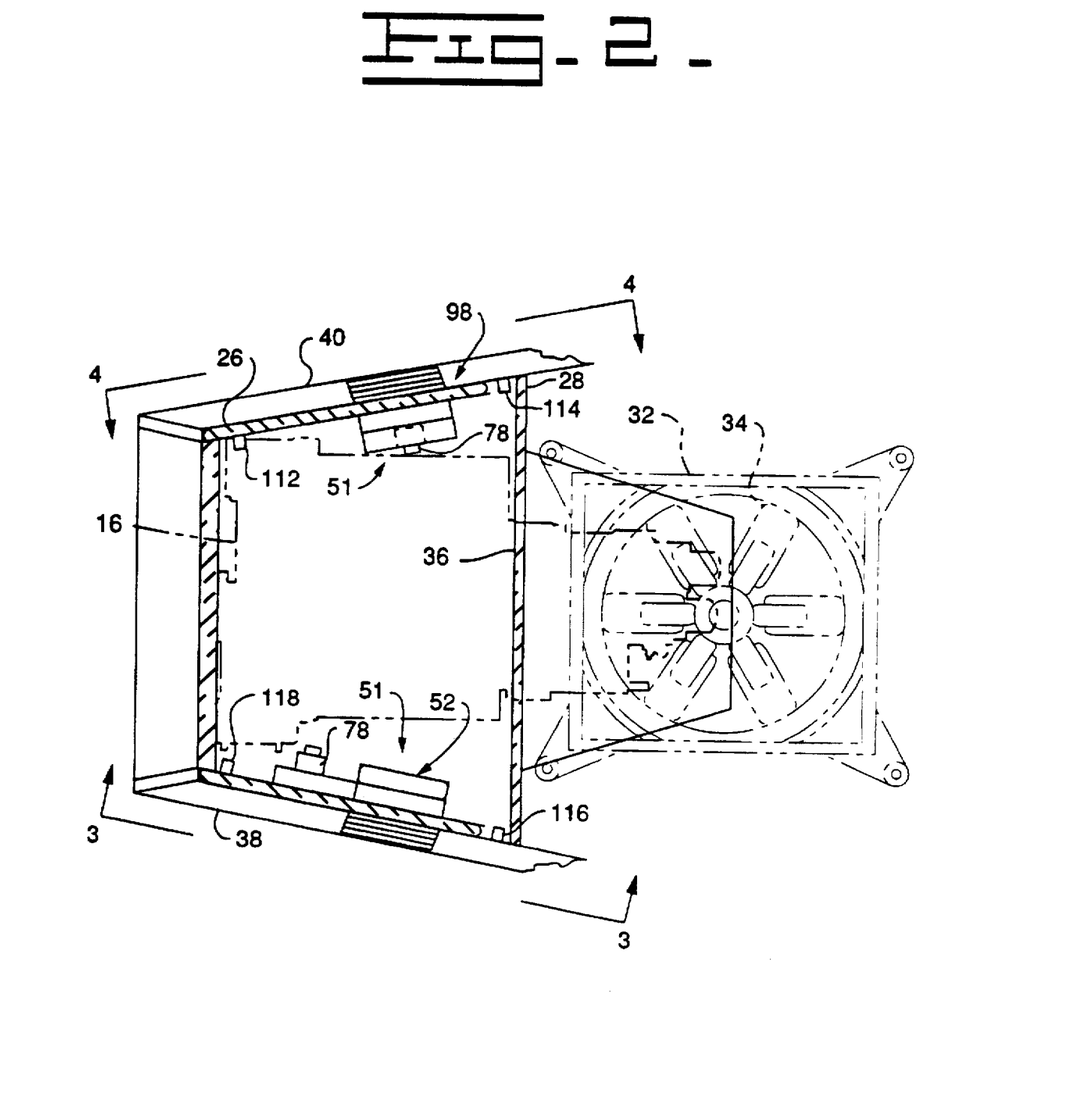
FIG. 2 is a partial top view taken along lines 2—2 indicated in FIG. 1.

The second air communicating means 98 differs from the first air communicating means 52 only in the location of the second air passageway 74. A second air passageway 100 of the second air communicating means 52 is positioned immediately below the first air passageway 54 and is in communication with the outlet portion 72 of the duct 66 along an upper extremity 102 of the second air passageway 100. The second air passageway 100 defines a plenum in which a plurality of blowers 78 are mounted. Like the plenum 74 defined in the first air communicating means 52, the plenum 100 is formed by a split bracket 84 having arcuate scallops 90 defined in bracket halves 86 and 88 that are mirror images of each other. As previously described, the bracket halves 86 and 88 may be clamped together about the blowers 78 by any suitable fastener 92 to secure the blowers in a generally vertical alignment. The bracket halves 86 and 88 may then be secured by any suitable fastener 64 to the plenum 100 of the second air passageway 100. The blowers of the second air communicating means 98 are positioned in vertical alignment with the first air passageway 54 so that the air flow therefrom may be directed more toward a forward portion of the first compartment 26 than the blowers 78 of the first air communicating means 52 to increase air flow and turbulence within the first compartment for improved cooling performance. Referring to FIG. 2, it can be seen that the blowers 78 of the first and second air communicating means 52 and 98 are positioned at an angle with respect to the components housed within the first compartment 26 by virtue of their mounting to the respective side panels 38 and 40. This positioning, coupled with the vertical positioning of the respective blowers, allows the flow of air therefrom to be directed to the various temperature sensitive components mounted within the first compartment to maintain an acceptable temperature in which they must operate. It must be noted, however, that the invention, while not specifically illustrated in the drawings, also comprehends the inclusion of individual adjustable air flow vents in the mounting of the blowers 78. The air flow vents may include any of the type normally used in automotive heating and air conditioning applications and may serve to more accurately "tune" or direct the flow of air within the first compartment 26 for more critical applications.

The first compartment 26 has an upper enclosing panel 104 that has an exhaust stack 106 that extends upwardly from the first compartment. The exhaust stack has an opening 108 formed about its base that opens to the interior of the first compartment. The exhaust stack is positioned to surround an exhaust pipe 110 that extends upwardly from an exhaust manifold (not shown) mounted on the engine 16 into the lower portion of the exhaust stack 106. The opening 108 of the exhaust stack is sufficiently larger than the exhaust pipe 110 so as to provide a vent for the air within the first compartment 26. To aid the venting of the first compartment 26, the relationship between the exhaust stack 106 and the exhaust pipe 110 is such that a pressure differential is created within the exhaust stack when the engine is operating and exhaust gasses are being forced into the exhaust stack 106 under pressure. This pressure differential creates a "chimney" or "venturi" effect and draws the air from within the first compartment 26 up the exhaust stack 106 thereby allowing the air to move freely into and out of the first compartment 26.

The blowers 78 are all infinitely variable in speed between a predetermined minimum and maximum speeds that are in turn determined by the temperature within the first compartment 26. The temperature is monitored by a plurality of heat sensors 112,114,116, and 118 that are positioned at the corners of the first compartment 26 (FIG. 2). It must be understood, however, that additional sensors may be positioned in close proximity or directly on extremely heat sensitive components if desired. In this particular application, the sensors are shown to be positioned to detect the overall temperature within the first compartment 26. The temperature readings of each heat sensor are fed into a controller or microprocessor 120 which in turn, directs a signal to the blowers 78 to control their speed of rotation.

Figure 8:
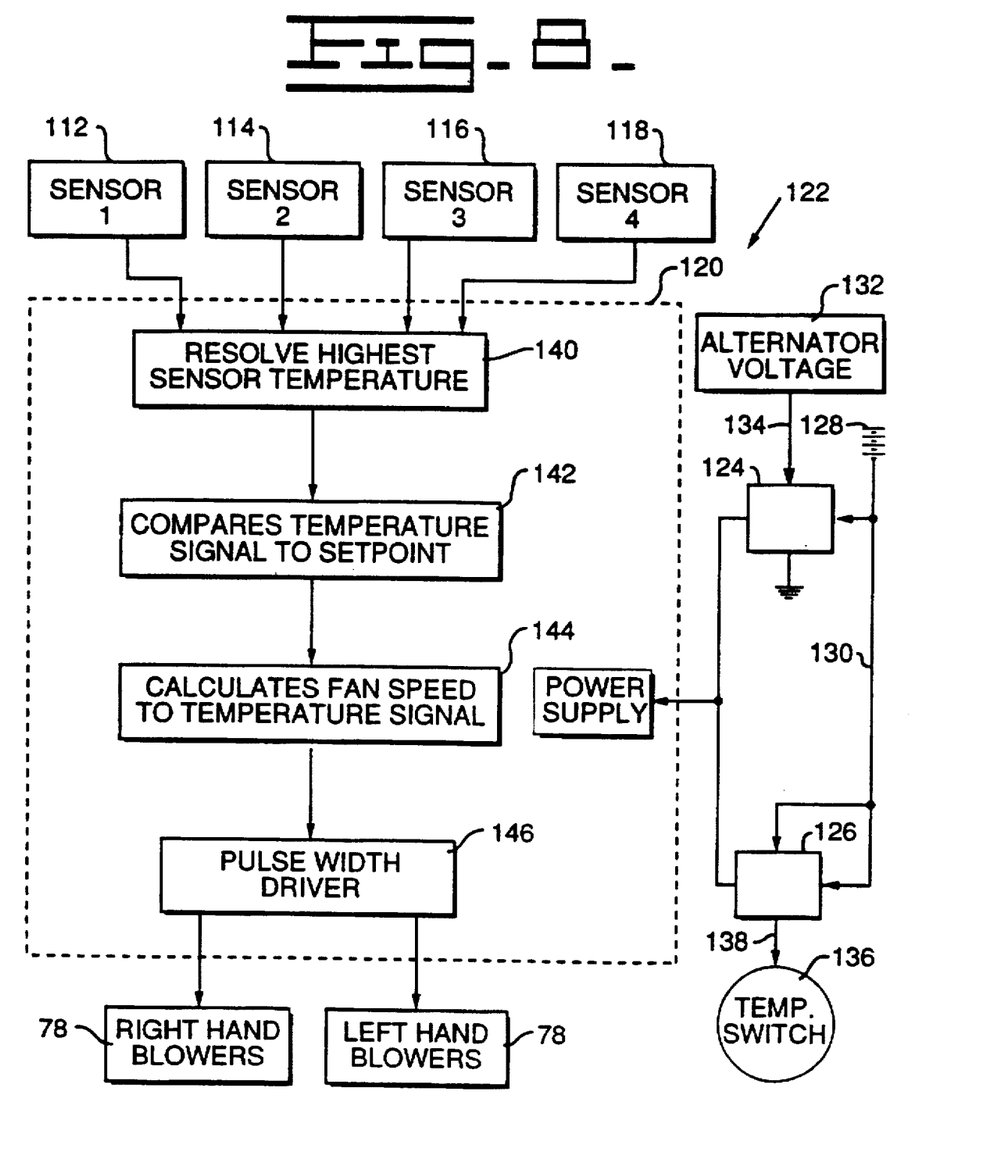
FIG. 8 is a block diagram of an embodiment of the electronic control means that embodies the principles of the present invention.

The controller 120 receives power from a relay circuit 122 that is schematically shown in FIG. 8. A pair of relays 124 and 126 are connected in series to a battery 128 via line 130. The alternator, shown schematically at 132, is connected to the relay 124 via line 134. A temperature switch 136, which is mounted in the enclosure 24, establishes a second, maximum set point of 150°, is connected to the relay 126 via line 138. When the engine is running, power is supplied to the controller 120 through the first relay upon introduction of electric current through the alternator. When the engine is shut down, power to the controller is maintained until the temperature within the enclosure 24 drops below the set point established by the temperature switch 136 whereupon current to the second relay and thus the controller 120 is terminated.

When the engine is running, it can be seen that a control block 140 within the controller receives a signal from each of the sensors in order to determine the highest temperature reading. A control block 142 then determines if the highest temperature is greater or less than a predetermined "set point" which determines the temperature at which the blowers will be activated. If the temperature is higher than the set point, a fan speed equivalent is calculated in control block 144. From control block 126 a signal is sent to a blower controller as indicated in control block 146. This control block then controls the rotational speed of all the blowers 78 in both first and second air communication means 52 and 98 through a pulse width driver as is well known in the art.

Industrial Applicability

When the engine 16 of a vehicle is initially started to begin operation, the temperature within the first compartment 26 is naturally relatively low. As the vehicle continues to operate, the surface temperatures of the engine 16 and other components 14 housed within the first compartment begin to rise rather quickly. In the initial phases of operation, air is drawn into the first compartment under the suction created by the pressure differential between the exhaust pipe 110 and the exhaust stack 106 as previously described. The air is drawn inwardly through the inlet port 68 and down the air duct 66 defined by the first air passageway 54. Referring to the first air communicating means shown in FIGS. 3, 5 and 7, the air is drawn through another right angle turn into the second air passageway or plenum 74. From the plenum 74 defined by the second air passageway, the air is drawn through yet another right angle turn into the first compartment 26. Air is drawn through the second air communicating means in the same fashion; however, the plenum 100 is positioned immediately subjacent the first air passageway 54 instead of being laterally offset. While this eliminates one right angle turn when compared to the path of air flow through the first air communicating means 52, positioning of the plenum in this manner allows the air to be introduced into the compartment forwardly of the first air communicating means 52. This results in a critical direction of air flow as well as an increase in the turbulence of the air within the enclosure.

As the temperature within the first compartment 26 increases, the heat sensors 112,114,116,118 become responsive to the rise in temperature and are constantly monitored by the controller 120. When any one of the sensors reaches a predetermined temperature or "set point", which in the subject invention is 35°, the controller sends a signal to the blowers 78 in both the first and second air communicating means 52 and 98 to activate the blowers simultaneously to rotate at a minimum speed. The controller utilizes the temperature input to calculate an equivalent speed of rotation that corresponds to the allowable range of temperatures programmed into the controller. In this instance, the low end of the temperature range has been established as 35° but may vary depending upon the application and environmental conditions. In some instances it may be desirable to establish a set point low enough to cause the blowers to operate with the start up of the engine. In doing so, the operator will be aware of their operation upon a walk around inspection of the vehicle normally conducted. The upper limit of the temperature range is established by the combination of the maximum allowable temperature in which the most heat sensitive component may reliably function and the knowledge of the maximum heat load that can be developed within the enclosure under extreme operating conditions. Therefore, as the temperature rises, the controller box calculates a rotation speed for the blowers that corresponds and is proportional to the highest temperature being indicated by the sensors and all of the blowers are adjusted accordingly. In the subject invention the maximum allowable temperature is approximately 180° and when attained, the blowers will all be operating at 100% capacity. When the engine is shut down, the blowers 78 are allowed to remain running until the temperature within the first compartment 26 drops below a second "set point" of approximately 150° that is established by a temperature switch mounted within the engine compartment whereupon they will automatically turn off.

With the ventilation system 51 disclosed above, a highly efficient means is provided for cooling the first compartment 26 as well as suppressing the noise that is created by the components housed therein. The inclusion of the air communicating means 52,98 into the side panels 38 and 40 of the first compartment 26 provides sufficient air flow for proper ventilation and yet allows the compartment to be well sealed for maximum noise suppression.

The utilization of a plurality of vaneaxial blowers within the air communicating means 52,98 allows selective direction of the air flow to the most heat sensitive components within the enclosure 24. Since all of the blowers 78 operate at the same speed, the overall noise produced by them is greatly reduced when compared to constant high-speed blowers that are normally used. The same advantage is gained when individual blowers having a constant fan speed are sequentially energized.

Also, since the air communicating means is positioned in hinged access panels on both sides of the vehicle, unrestricted access to the engine 16 and related components 14 is afforded for service.

Additionally, since the ventilation system 51 for the engine enclosure does not rely on an axial-type fan that is normally associated with the fluid cooling system, the fluid cooling apparatus 30 may be housed in a separate compartment. In so doing, the fan associated with the fluid cooling apparatus 30 may operate at greatly reduced speed, thus further reducing the overall noise created in the operation of the vehicle 10.

Other aspects, objects and advantages of this invention may be obtained from a study of the drawings, the disclosure and the appended claims.

We claim:

1. A ventilation apparatus (51) adapted to provide a flow of cooling air to a plurality of components (14) positioned within an enclosure (24) defined by a plurality of sound absorbing panels (36,38,40,104), said ventilation apparatus being characterized by:

means (52,98) for communicating ambient air from a location outside the enclosure (24) to a location within the enclosure (24), said air communicating means (52,98) forming a circuitous air passageway (54,74, 100) that is lined with sound absorptive material and is positioned within at least a first (38) of the plurality of panels (36,38,40,104) defined by the enclosure (24);

a plurality of blowers (78) mounted within the air communicating means (52,98) for drawing ambient air through the air communicating means (52,98) and directing it into the enclosure (24) under a variable flow and pressure; and means (112,114,116,118) for sensing the temperature within the enclosure (24), said sensing means being operatively associated with the blowers (78) to incrementally adjust the operating speed of all the blowers (78) simultaneously in response to the rise and fall of the temperature within the enclosure (24).

2. The ventilation apparatus (51) as set forth in claim 1 wherein the enclosure (24) houses an engine (16) and a plurality of engine driven components (14) utilized to drive a vehicle (10).

3. The ventilation apparatus (51) as set forth in claim 1 wherein the air communicating means (52,98) further includes:

a first, generally vertically oriented air passageway (54) that is secured to an inner surface (48) of the first panel (38);

an air intake port (70) that opens onto an outer surface (49) of the first panel (38) and communicates with an upper portion (58) of the first air passageway (54); and a second air passageway (74) that is positioned laterally adjacent the first air passageway (54) and being positioned for communication with a lower portion (72) therof.

4. The ventilation apparatus (51) as set forth in claim 3 wherein the blowers (78) are of a vaneaxial configuration and are mounted in vertical alignment with respect to one another within the second air passageway (74).

5. The ventilation apparatus (51) as set forth in claim 4 wherein the blowers (78) are individually adjustable with respect to one another to direct a flow of cooling air toward specific ones of the components (14) housed within the enclosure (24).

6. The ventilation apparatus (51) as set forth in claim 1 wherein the first panel (38) of the enclosure (24) further defines a vertically oriented access cover.

7. The ventilation apparatus (51) as set forth in claim 1 wherein a second air communicating means (98) is positioned in a second panel (40) of said enclosure (24) and is located on an opposite side of the heat producing components (14) from the first panel (38), said second air communicating means (98) defining a second plurality of blowers (78) that direct cooling air to an opposite side of the components (14) housed within the enclosure (24).

8. The ventilation apparatus (51) as set forth in claim 7 wherein the second air communicating means (98) further includes:

a first generally vertically oriented air passageway (54);

an air inlet port (70) communicating said first air passageway (54) to the ambient air outside said enclosure (24);

a plenum portion (100) positioned subjacent a lower portion (72) of the first air passageway (54); and means (84) for mounting the second plurality of blowers (78) within the plenum portion (100) in a manner sufficient for drawing ambient air from outside the enclosure (24) inwardly through the air inlet port (70), downwardly through the first air passageway (54) into the plenum portion (100) and expelling the air inwardly into the enclosure (24) directly toward selected ones of the said components (14) housed therein.

9. The ventilation apparatus (51) as set forth in claim 7 wherein the air passageways (54) defined by the first and second air communicating means (52,98) are lined with sound absorptive material of varied thickness to absorb sound of varied frequencies.

10. The ventilation apparatus (51) as set forth in claim 1 wherein the enclosure (54) further includes:

a first compartment (26) having an interior lining of sound absorptive material (50) and being positioned to encase a plurality of heat producing drive train components (14) that power said vehicle (10);

a second compartment (28) sufficient for housing an apparatus (30) for cooling fluid that is circulated internally through at least one of said drive train components (14);

a first sidewall (38) defined by the first compartment (26);

a second sidewall (40) defined by the first compartment (26) and being positioned on an opposite side of the drive train components (14) from the first sidewall (38); and a first and second means (52,98) for communicating a flow of cooling air that is drawn from ambient air outside the first compartment (26) and directed toward selected ones of said heat producing drive train components (14) housed within the first compartment (26),
said first air communicating means (52) being position within said first sidewall (38) and said second air communicating means (98) being positioned within said second sidewall (40).

11. The ventilation apparatus (51) as set forth in claim 10 wherein one of the fluid cooling apparatus (30) housed within the second compartment (28) includes a radiator (32) and a fan (34) that directs a cooling flow of air toward the radiator (32) to cool the fluid circulating therethrough.

* * * * *